(12) United States Patent
Matsushita et al.

(10) Patent No.: US 10,189,111 B2
(45) Date of Patent: Jan. 29, 2019

(54) INDIRECT SPOT WELDING METHOD

(71) Applicant: JFE STEEL CORPORATION, Tokyo (JP)

(72) Inventors: Muneo Matsushita, Tokyo (JP); Rinsei Ikeda, Tokyo (JP); Akihide Yoshitake, Toyko (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 14/901,172

(22) PCT Filed: May 27, 2014

(86) PCT No.: PCT/JP2014/002797
§ 371 (c)(1),
(2) Date: Dec. 28, 2015

(87) PCT Pub. No.: WO2014/207999
PCT Pub. Date: Dec. 31, 2014

(65) Prior Publication Data
US 2016/0144449 A1 May 26, 2016

(30) Foreign Application Priority Data
Jun. 26, 2013 (JP) .................................. 2013-134028

(51) Int. Cl.
*B23K 9/28* (2006.01)
*B23K 11/11* (2006.01)
(Continued)

(52) U.S. Cl.
CPC ............... *B23K 11/11* (2013.01); *B23K 11/16* (2013.01); *B23K 11/3009* (2013.01);
(Continued)

(58) Field of Classification Search
CPC ..... B23K 11/11; B23K 11/16; B23K 11/3009; B23K 11/31; B23K 11/002; B23K 11/115;
(Continued)

(56) References Cited

U.S. PATENT DOCUMENTS 1,792,243 A * 2/1931 Richter ................ B23K 9/0737
219/123
1,976,552 A * 10/1934 Friesen .................. B23K 11/24
219/86.21
(Continued)

FOREIGN PATENT DOCUMENTS

| JP | 50122438 | 9/1975 |
|----|----------|--------|
| JP | 11333569 | 12/1999 |

(Continued)

OTHER PUBLICATIONS

Supplementary European Search Report for EP 14817396, dated Jun. 17, 2016, 5 pages.
(Continued)

*Primary Examiner* — Dana Ross
*Assistant Examiner* — Ket D Dang
(74) *Attorney, Agent, or Firm* — RatnerPrestia (57) ABSTRACT

This indirect spot welding is for welding members including at least two overlapping steel sheets that have a ferrite phase as a main phase by holding a welding electrode (23) against a steel sheet (21) from one side while applying pressure with the electrode (23), attaching a feeding point (24) to a steel sheet (22) at the other side at a location remote from the electrode (23), and allowing current to flow between the electrode (23) and the feeding point (24). This welding includes contacting magnetic rigid bodies (26-1, 26-2) to a peripheral area of the electrode (23) from the one side against which the electrode (23) is held and securing an
(Continued)

overlapping region in the peripheral area of the electrode (23) by a magnetic force produced by the rigid bodies (26-1, 26-2), thereby obtaining a weld having fully satisfactory strength, regardless of the rigidity of the members.

4 Claims, 4 Drawing Sheets

(51) Int. Cl.

| | | |
|---|---|---|
| *B23K 11/16* | (2006.01) | |
| *B23K 11/30* | (2006.01) | |
| *B23K 11/31* | (2006.01) | |
| *B23K 101/18* | (2006.01) | |
| *B23K 103/04* | (2006.01) | |
| *B23K 103/16* | (2006.01) | |

(52) U.S. Cl.
CPC ........ *B23K 11/31* (2013.01); *B23K 2101/185* (2018.08); *B23K 2103/04* (2018.08); *B23K 2103/16* (2018.08); *B23K 2103/172* (2018.08)

(58) Field of Classification Search
CPC .......... B23K 2203/172; B23K 2203/04; B23K 2203/16; B23K 2201/185
USPC ........... 219/86.32, 78.01, 86.1, 86.22, 86.23, 219/86.25, 86.9, 89, 78.3, 61.2, 60 A, 219/61.7, 67; 228/44.3, 44.5, 44.7
See application file for complete search history.

(56) References Cited

U.S. PATENT DOCUMENTS

| | | | | |
|---|---|---|---|---|
| 2,001,179 A | * | 5/1935 | Brugge | B23K 9/0737 219/123 |
| 2,232,450 A | * | 2/1941 | Hagedorn | B23K 11/312 219/86.1 |
| 2,272,968 A | * | 2/1942 | Dyer | B23K 11/31 219/128 |
| 2,857,503 A | * | 10/1958 | Rudd | B23K 13/043 219/60 A |
| 3,089,020 A | * | 5/1963 | Hurlebaus | B23K 11/163 219/234 |
| 3,275,786 A | * | 9/1966 | Cushman | B23K 9/0253 219/123 |
| 3,591,757 A | * | 7/1971 | Rudd | B23K 13/02 219/102 |
| 3,840,170 A | * | 10/1974 | Arikawa | B23K 37/0217 228/29 |
| 3,860,778 A | | 1/1975 | Wallace | |
| 4,418,264 A | * | 11/1983 | Thorwarth | H05K 3/225 219/119 |
| 4,902,869 A | * | 2/1990 | Wald | B23K 11/115 219/86.32 |
| 4,910,376 A | * | 3/1990 | Riley | B23K 35/0205 219/119 |
| 8,334,474 B1 | * | 12/2012 | Oatridge | B23K 11/11 219/86.22 |
| 2003/0222054 A1 | | 12/2003 | Katou | |
| 2005/0161965 A1 | | 7/2005 | Eberlein | |
| 2011/0272384 A1 | | 11/2011 | Matsushita | |

FOREIGN PATENT DOCUMENTS

| | | |
|---|---|---|
| JP | 2002239742 | 8/2002 |
| JP | 2006198676 | 8/2006 |
| JP | 2007167933 | 7/2007 |
| JP | 2007521964 A | 8/2007 |
| JP | 2010194609 | 9/2010 |
| JP | 2011050977 | 3/2011 |
| JP | 2011194459 | 10/2011 |
| JP | 2012035278 | 2/2012 |
| JP | 2012091203 | 5/2012 |
| JP | 2012157888 | 8/2013 |

OTHER PUBLICATIONS

Korean Office Action for Korean Application No. 2015-7034493, dated Oct. 16, 2016, including Concise Statement of Relevance, 5 pages.
International Search Report for International Application No. PCT/JP2014/002797 dated Jul. 29, 2014.
Japanese Office action dated Oct. 20, 2015 in Japanese Application No. 2014-539176.
Korean Office Action with partial English language translation for Application No. 10-2015-7034493, dated May 15, 2017, 5 pages.

* cited by examiner

INDIRECT SPOT WELDING METHOD

CROSS REFERENCE TO RELATED APPLICATIONS

This is the U.S. National Phase application of PCT/JP2014/002797, filed May 27, 2014, which claims priority to Japanese Patent Application No. 2013-134028, filed Jun. 26, 2013, the disclosures of each of these applications being incorporated herein by reference in their entireties for all purposes.

TECHNICAL FIELD

This disclosure relates to an indirect spot welding method for welding members including at least two overlapping metal sheets by holding a welding electrode against a metal sheet from one side while applying pressure with the welding electrode, attaching a feeding point to the metal sheet at the other side at a location remote from the welding electrode, and allowing current to flow between the welding electrode and the feeding point.

BACKGROUND

Resistance spot welding, mainly direct spot welding, has conventionally been used to weld automobile components, starting with automobile bodies. Recently, however, series spot welding, indirect spot welding, and the like have been used.

The characteristics of these three types of spot welding are described below with reference to FIGS. 1(a) to 1(c).

These forms of spot welding are alike in that at least two overlapping metal sheets are welded.

Figure 1A:
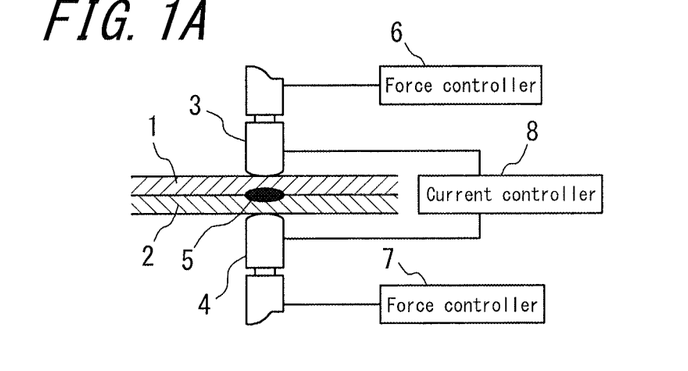
FIG. 1(a) illustrates welding with a direct spot welding method.

FIG. 1(a) illustrates the direct spot welding method. As illustrated, direct spot welding is a method that squeezes two overlapping metal sheets 1 and 2 from above and below with a pair of electrodes 3 and 4 and applies current while applying pressure with the electrodes 3 and 4, so as to form a spot-like weld 5 using resistance heat generated between the metal sheets. The electrodes 3 and 4 are provided with respective force controllers 6 and 7 and a current controller 8, which constitute a mechanism that allows for control of the pressing force and the current.

Figure 1B:
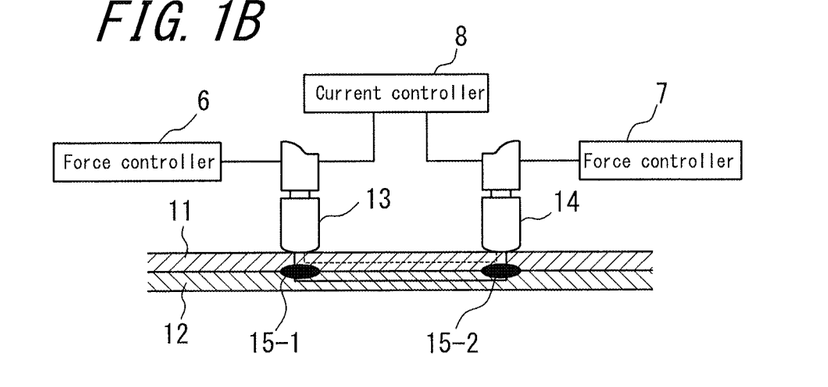
FIG. 1(b) illustrates welding with a series spot welding method.

The series spot welding method illustrated in FIG. 1(b) is a method of applying current while applying pressure with a pair of electrodes 13 and 14 to two overlapping metal sheets 11 and 12 from the same side (same direction) at separate positions to form spot-like welds 15-1 and 15-2.

Figure 1C:
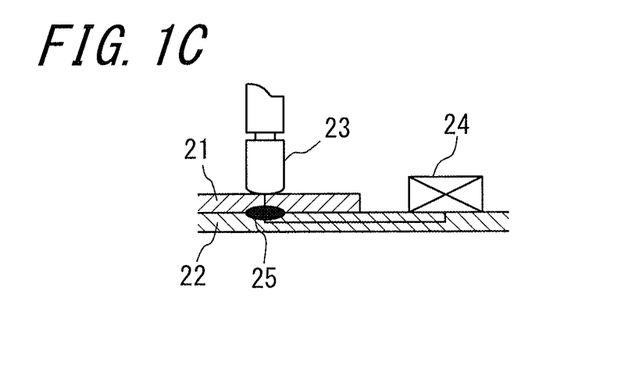
FIG. 1(c) illustrates welding with an indirect spot welding method.

The indirect spot welding method illustrated in FIG. 1(c) is a method in which a spot-like weld 25 is formed in two overlapping metal sheets 21 and 22 by holding an electrode 23 against one of the metal sheets 21 while applying pressure with the electrode 23, attaching a feeding point 24 to the other metal sheet 22 at a separate location, and allowing current to flow between the electrode 23 and the feeding point 24.

Therefore, among these three welding methods, the direct spot welding method is used when there is ample space for an opening allowing the metal sheets to be squeezed from above and below. In actual welding, however, there is often not enough room, and it is often difficult to squeeze the metal sheets from above and below in a closed cross-sectional structure. The series spot welding method or the indirect spot welding method is used in such cases.

When the series spot welding method or the indirect spot welding method is used in applications such as those described above, however, the overlapping metal sheets are pressed by an electrode from only one side, with the other side of the metal sheets being unsupported in midair. Therefore, unlike the direct spot welding method that squeezes the metal sheets with electrodes on both sides, it is not possible to apply a high pressing force locally to the weld. Furthermore, since the electrode sinks into the metal sheet during application of current, the condition of contact between the electrode and the metal sheet and between the metal sheets changes over time. For these reasons, the current path between the overlapping metal sheets is unstable, leading to the problem of difficulty in forming a regular fused joint.

To address this problem, JP H11-333569 A (PTL 1) discloses series spot welding in which "in order to form a nugget at a point of contact between overlapping metal sheets, a large current is applied during the initial phase of welding to form an electrode nugget, and then steady current is applied".

JP 2002-239742 A (PTL 2) discloses that "a seating face that is raised above the surrounding area is formed at the position to be contacted by the electrode, and welding is performed by contacting and applying pressure so as to press against the seating face, yielding a sufficient weld strength without a back electrode".

As a technique that can also be applied to series spot welding, JP 2006-198676 A (PTL 3) discloses a welding method for indirect spot welding in which "during application of current in series spot welding or indirect spot welding, a time period in which the current is maintained high and a time period in which the current is maintained low are alternately repeated" and also discloses a welding method in which "as the time period in which the current is maintained high and the time period in which the current is maintained low are alternately repeated, the current in the time period in which the current is maintained high is gradually raised".

As a welding method for forming a regular fused nugget, we developed an indirect spot welding method that adopts two-step control and disclosed this method in JP 2010-194609 A (PTL 4):

"An indirect spot welding method for welding members including at least two overlapping metal sheets by holding a welding electrode against a metal sheet from one side while applying pressure with the welding electrode, attaching a feeding point to the metal sheet at the other side at a location remote from the welding electrode, and allowing current to flow between the welding electrode and the feeding point, wherein with respect to a pressing force of the welding electrode and the current, a time from turning on electricity is divided into a first time period $t_1$ and a second time period $t_2$, and after a pressing force $F_1$ is applied and a current $C_1$ is applied in the first time period $t_1$, a pressing force $F_2$ that is lower than the pressing force $F_1$ is applied and a current $C_2$ that is higher than the current $C_1$ is applied in the second time period $t_2$".

With respect to the indirect spot welding method disclosed in PTL 4, we also discovered that by limiting the pressing force $F_1$ and current $C_1$ in the first time period $t_1$ and the pressing force $F_2$ and current $C_2$ in the second time period $t_2$ during the two time periods $t_1$ and $t_2$ from the time from turning on electricity, as indicated by Expressions (1) to (4) below, welding can be performed more effectively, and we disclosed this discovery in JP 2012-035278 A (PTL 5):

$$1.2F_2 \leq F_1 \leq 5F_2 \tag{1}$$

$$0.25C_2 \leq C_1 \leq 0.85C_2 \tag{2}$$

$$35T^{2.3} \leq F_2 \leq 170T^{1.9} \quad (3), \text{ and}$$

$$2T^{0.5} \leq C_2 \leq 5.5T^{0.9} \quad (4)$$

where T is the total sheet thickness (mm) of the overlapping metal sheets.

As a further development of the above technique, we also progressed from two-step control to three-step control and disclosed this discovery in JP 2011-194459 A (PTL 6):

"An indirect spot welding method for welding members including at least two overlapping metal sheets by holding a welding electrode against a metal sheet from one side while applying pressure with the welding electrode, attaching a feeding point to the metal sheet at the other side at a location remote from the welding electrode, and allowing current to flow between the welding electrode and the feeding point, wherein with respect to a pressing force of the welding electrode and the current, a time from turning on electricity is divided into a first time period $t_1$, a second time period $t_2$, and a third time period $t_3$, a pressing force $F_1$ is applied and a current $C_1$ is applied in the first time period $t_1$, a pressing force $F_2$ that is lower than the pressing force $F_1$ is applied and a current $C_2$ that is higher than the current $C_1$ is applied in the second time period $t_2$, and a pressing force $F_3$ that is the same as or lower than the pressing force $F_2$ is applied and a current $C_3$ that is higher than the current $C_2$ is applied in the third time period $t_3$".

With respect to the indirect spot welding method disclosed in PTL 6, we also discovered that by limiting the pressing force $F_1$ and current $C_1$ in the first time period $t_1$, the pressing force $F_2$ and current $C_2$ in the second time period $t_2$, and the pressing force $F_3$ and current $C_3$ in the third time period $t_3$ during the three time periods $t_1$, $t_2$, and $t_3$ from the time from turning on electricity, as indicated by Expressions (1) to (6) below, welding can be performed even more effectively, and we disclosed this discovery in JP 2012-091203 A (PTL 7):

$$1.2F_2 \leq F_1 \leq 3F_2 \quad (1),$$

$$0.25C_2 \leq C_1 \leq 0.9C_2 \quad (2),$$

$$F_3 \leq F_2 \leq 3F_3 \quad (3),$$

$$0.5C_3 \leq C_2 \leq 0.9C_3 \quad (4),$$

$$30T^{2.1} \leq F_3 \leq 170T^{1.9} \quad (5), \text{ and}$$

$$2T^{0.5} \leq C_3 \leq 5.5T^{0.9} \quad (6)$$

where T is the total sheet thickness (mm) of the overlapping metal sheets.

We also discovered and disclosed the following in JP 2011-050977 A (PTL 8): "An indirect spot welding method for welding members including at least two overlapping metal sheets by holding a welding electrode against a metal sheet from one side while applying pressure with the welding electrode, attaching a feeding point to the metal sheet at the other side at a location remote from the welding electrode, and allowing current to flow between the welding electrode and the feeding point, wherein by electrically insulating the overlapping surface between the metal sheets, except for a location to be welded, dispersion of current can be suppressed at the time of welding, and a fused nugget can be stably formed".

Furthermore, we discovered and disclosed the following in JP 2012-157888 A (PTL 9):

"An indirect spot welding method for welding members including at least two overlapping metal sheets by holding a welding electrode against a metal sheet from one side while applying pressure with the welding electrode, attaching a feeding point to the metal sheet at the other side at a location remote from the welding electrode, and allowing current to flow between the welding electrode and the feeding point, wherein welding is performed in a state such that an insulating viscous material is provided between the metal sheets on an entire overlapping surface.

During indirect spot welding for welding members including at least two overlapping metal sheets by holding a welding electrode against a metal sheet from one side while applying pressure with the welding electrode, attaching a feeding point to the metal sheet at the other side at a location remote from the welding electrode, and allowing current to flow between the welding electrode and the feeding point, in particular such that the overlapping metal sheets are pressed by an electrode from only one side, with the other side of the metal sheets being unsupported in midair, then the member exposed to a load by the electrode pressing force warps, and due to the warping the condition of contact between the members changes. Therefore, during indirect spot welding for welding using heat generated by contact resistance, the weld quality is unavoidably affected by warping of the member.

Among conventional indirect spot welding methods, however, a method for obtaining a weld that has fully satisfactory strength even when the rigidity of the members is low has not been disclosed whatsoever.

CITATION LIST

Patent Literature

PTL 1: JP H11-333569 A
PTL 2: JP 2002-239742 A
PTL 3: JP 2006-198676 A
PTL 4: JP 2010-194609 A
PTL 5: JP 2012-035278 A
PTL 6: JP 2011-194459 A
PTL 7: JP 2012-091203 A
PTL 8: JP 2011-050977 A
PTL 9: JP 2012-157888 A

SUMMARY

Technical Problem

It could therefore be helpful to provide an indirect spot welding method, in particular for indirect spot welding of a portion where overlapping steel sheets are pressed by an electrode from only one side with the other side of the steel sheets being unsupported in midair, that allows for formation of a regular fused nugget and yields a weld having fully satisfactory strength, regardless of the rigidity of the members.

Solution to Problem

As a result of thorough study to resolve the above problems, we made the discoveries described below.

a) When performing indirect spot welding in which overlapping steel sheets are pressed by an electrode from only one side with the other side of the steel sheets being unsupported in midair, the pressing force cannot be supported by a pair of opposing electrodes, as in a direct spot welding method in which the steel sheets are squeezed from both sides by electrodes. Therefore, the member exposed to a load by the electrode pressing force warps, and due to the warping the condition of contact between the members changes. Therefore, during indirect spot welding for welding using heat generated by contact resistance, the weld quality is affected by warping of the member.

In other words, the weld quality varies depending on the rigidity of the members that are welded. In particular, when the rigidity of the members is low, then the warping increases, and the contact area between the members increases. The current density at the weld thus lowers, making it difficult to achieve a weld with satisfactory strength.

b) In particular, in members to be welded such as large panels or the like, at a portion where the weld has a large curvature and there is no bent portion with a small curvature nearby, and the sheet thickness of the members is small, then the rigidity of the members reduces.

c) When welding members with a low rigidity, such as in b), by indirect spot welding in a state such that the opposite side from the electrode is unsupported in midair, the warping of the members at the time of welding can be reduced by increasing the number of fastening locations on the jig that supports the members. In this case, however, not only does the structure of the jig become complex, leading to increased manufacturing costs, but also a longer time is required for mounting the members onto the jig, leading to the risk of decreased productivity. Hence, this method cannot be considered effective.

d) Based on the above, a welding method that can support the members using a simple jig and that can suppress warping of the weld only at the time of welding could be considered effective. We discovered that an effective example of such a method is to contact rigid bodies that produce a magnetic force to the peripheral area of the electrode from the side against which the welding electrode is pressed, thereby securing the overlapping members.

Our method is based on these findings.

We thus provide:

1. An indirect spot welding method for welding members including at least two overlapping steel sheets that have a ferrite phase as a main phase by holding a welding electrode against a steel sheet from one side while applying pressure with the welding electrode, attaching a feeding point to a steel sheet at the other side at a location remote from the welding electrode, and allowing current to flow between the welding electrode and the feeding point, the method comprising: contacting a magnetic rigid body to a peripheral area of the welding electrode from the one side against which the welding electrode is held and securing an overlapping region in the peripheral area of the welding electrode by a magnetic force produced by the rigid body.

2. The indirect spot welding method described above in ¶24, wherein the welding is performed in a state such that an insulating viscous material 5 is provided on an entire overlapping surface of the members except for in a welding area.

Advantageous Effect

According to our indirect spot welding method, a weld having fully satisfactory strength can be obtained, regardless of the rigidity of the members.

BRIEF DESCRIPTION OF THE DRAWINGS

In the accompanying drawings:

FIGS. 2(a) to 2(c) illustrate how to perform our indirect spot welding method, where

FIGS. 3(a) to 3(c) illustrate how to perform our indirect spot welding method, where

DETAILED DESCRIPTION

The following provides a detailed explanation in accordance with the drawings.

Figure 2A:
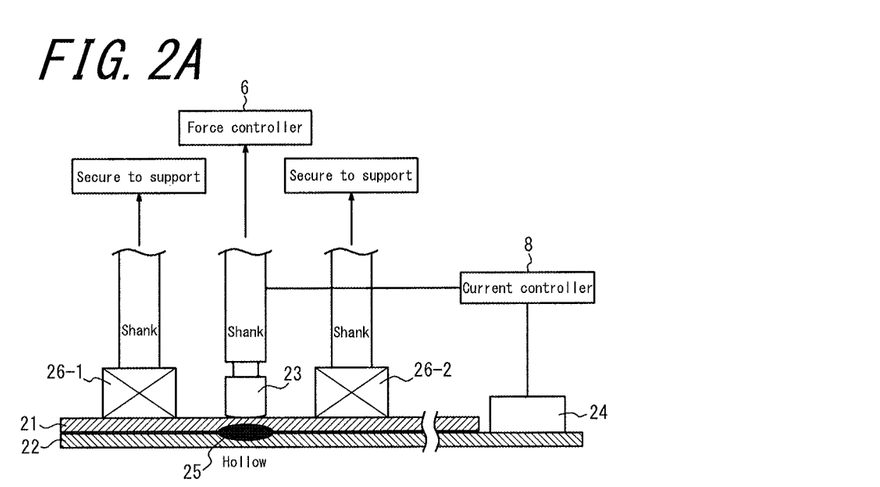
FIG. 2(a) is a schematic view of the arrangement of each part from the side.

FIG. 2(a) is a schematic view of the arrangement of each part from the side, illustrating how to perform our indirect spot welding in which welding is performed by contacting rigid bodies that produce a magnetic force to the peripheral area of the electrode from the side against which the welding electrode is pressed, thereby securing the overlapping members.

In FIG. 2(a), since the basic structure is the same as that illustrated in FIG. 1(c), the same reference numerals are used, particularly with the addition of 26-1 and 26-2 indicating magnetic rigid bodies.

The rigid bodies 26 that produce a magnetic force are disposed in a peripheral area of the electrode 23 at the side against which the welding electrode is pressed and are secured to a support via a shank. This support (not illustrated) is either a bracket for securing the force controller to which the welding electrode 23 is connected via the shank or is a structure that is independent of the system to which the welding electrode 23 is connected and can follow the movement of the welding electrode 23 when the welding position is changed.

Figure 2B:
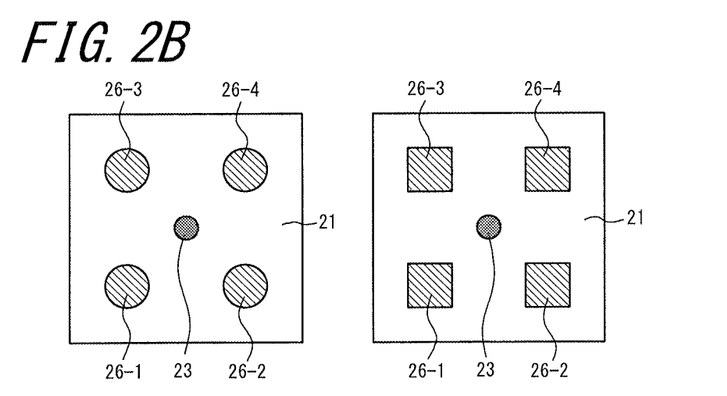
FIG. 2(b) is a schematic view, from above the electrode, of an example of the positional relationships between the electrode and a plurality of independent rigid bodies that have a circular or polygonal contact face, produce a magnetic force, and are disposed around the electrode.
Figure 2C:
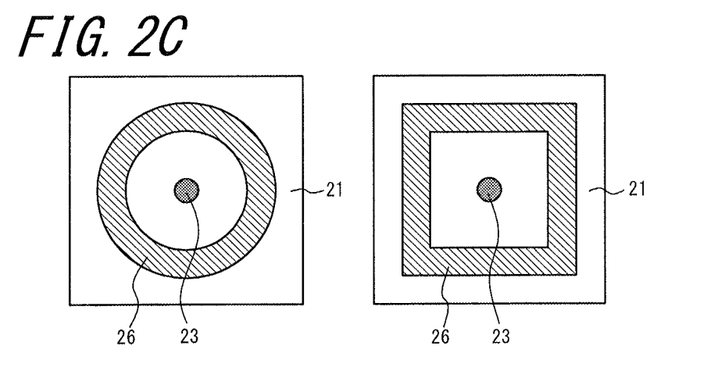
FIG. 2(c) is a schematic view, from above the electrode, of an example of the positional relationship between the electrode and a rigid body that has a contact face shaped as a ring or a polygonal circuit, produces a magnetic force, and is disposed so as to surround the electrode.

As for the shape of the rigid body 26 that produces a magnetic force and the arrangement with respect to the electrode 23, a plurality of independent rigid bodies 26-1 to 26-4 that have a circular or polygonal contact face and produce a magnetic force may be disposed around the electrode 23, as in FIG. 2(b), or a rigid body 26, which has a contact face shaped as a ring or a polygonal circuit and produces a magnetic force, may be disposed to surround the electrode 23, as in FIG. 2(c).

As the magnet that is the source of the magnetic force, either an electromagnet or a permanent magnet may be used. Using an electromagnet is advantageous, however, since such a magnet can easily be secured to the member before welding and detached from the member after welding. The surface that contacts the member needs to be flat and to be made from a material with high rigidity.

When using a permanent magnet, advantageous examples of such material include an alnico magnet, an iron-chrome-cobalt magnet, a ferrite magnet, a neodymium magnet, and a samarium-cobalt magnet. When using an electromagnet, iron-based material is advantageous, and it suffices to provide a flat surface on an iron core that uses such iron-based material and contact the flat surface to the member. It is advantageous for the total area of the flat surface necessary for securing the member to be 1000 $mm^2$ or more.

The magnetic flux density of the rigid body that produces a magnetic force is 0.2 tesla to 0.6 tesla at the surface of the face that contacts the member. At under 0.2 tesla, a magnetic force sufficient for securing the members cannot be obtained, whereas upon exceeding 0.6 tesla, iron scraps and the like are attracted and attach to the weld, which may cause welding defects.

The overlapping members need to be metal materials having, as a base material, a ferromagnetic body that has the property of being attracted by a magnetic force. In the case of iron and steel, a steel sheet having a ferrite phase as the main phase is preferable. Some of the latest high-strength steel sheets for automobiles are designed to allow for high elongation by including retained austenite. In such steel sheets, the proportion of ferrite decreases as the proportion of retained austenite increases, and hence the magnetic property weakens. In our welding method, using steel sheets in which the proportion of the ferrite phase is 90% or more is preferable in terms of achieving satisfactory effects.

In our method, the peripheral area of the electrode is defined so that when a portion of an object is within a 50 mm radius from the central axis of the electrode, the object is considered to be disposed in the peripheral area of the electrode.

In our method, material with rigidity is defined as material corresponding to metal, intermetallic compounds, or inorganic material. For example, material that can flexibly deform, such as a magnetic sheet yielded by mixing a magnet into an organic material such as rubber, is excluded.

In addition to the above welding method to contact a rigid body that produces a magnetic force to the peripheral area of the electrode from the side against which the welding electrode is pressed so as to secure the overlapping members, an even better weld can be obtained by providing an insulating viscous material on the entire overlapping surface of the members and welding in a state such that the overlapping surface between the steel sheets is electrically insulated by the viscous material, except for in the welding area.

Figure 3A:
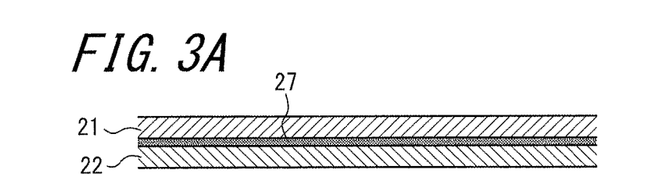
FIG. 3(a) illustrates the stage at which an insulating viscous material is provided on the overlapping surface between the metal sheets.
Figure 3B:
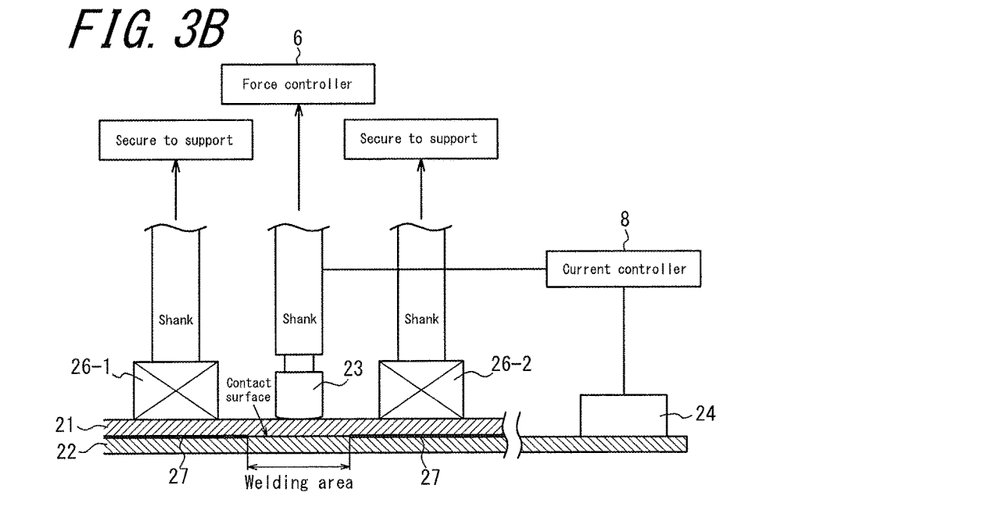
FIG. 3(b) illustrates the stage at which, after securing the peripheral area of the electrode with the rigid bodies that produce a magnetic force, the welding electrode is held against a metal sheet from one side while applying pressure with the welding electrode.
Figure 3C:
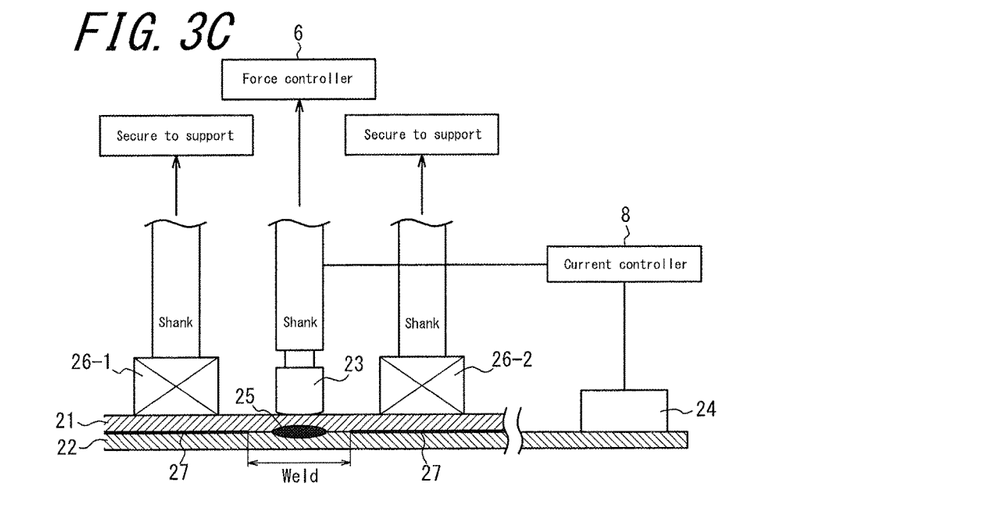
FIG. 3(c) illustrates the stage at which current is applied between the welding electrode and the feeding point.

FIGS. 3(a) to 3(c) illustrate how to perform our indirect spot welding method, in which welding is performed in a state such that an insulating viscous material is provided between the steel sheets on the overlapping surface, i.e. in a state such that the overlapping surface between the steel sheets is electrically insulated by the viscous material, except for in the welding area.

First, as illustrated in FIG. 3(a), insulating viscous material 27 is provided on the overlapping surface between the overlapping steel sheets. The metal sheets are thus electrically insulated from each other.

Next, as illustrated in FIG. 3(b), after contacting rigid bodies 26 that produce a magnetic force to the peripheral area of the electrode from the side against which the welding electrode 23 is pressed, thereby securing the overlapping members, the welding electrode 23 is pressed against the one side of the steel sheets while applying pressure. With this electrode pressure, the viscous material 27 is pushed out of the welding area, guaranteeing a contact surface between the steel sheets.

In the above state with electrode pressure applied, welding is performed by applying current between the welding electrode 23 and the feeding point 24, as illustrated in FIG. 3(c).

By welding in the above-described way, warping of the members is suppressed. Furthermore, current passage between the steel sheets is limited to the welding area, yielding a high current density. Therefore, a weld having satisfactory strength can be stably formed regardless of the rigidity of the members.

In our method, the insulating viscous material is preferably formed from a material that has a sufficiently large specific resistance and that, when disposed between the steel sheets, has enough resistance to cut off current passage between the steel sheets at the time of welding. Furthermore, the insulating viscous material preferably has appropriate viscosity and coating thickness, i.e. viscosity and coating thickness such that, when the steel sheet is pressed by the electrode, the viscous material is pushed out from the welding area to guarantee current passage between the steel sheets.

The viscosity is preferably in a range of 0.1 Pa·s to 1000 Pa·s. If the viscosity is smaller than this range, the viscous material is excessively pushed out when the steel sheet is pressed by the electrode, and the effect of limiting current passage to the welding area is not sufficiently achieved. Conversely, if the viscosity exceeds this range, the viscous material cannot be sufficiently pushed out from the welding area when the steel sheet is pressed by the electrode, and current might not pass through the welding area. A more preferable viscosity range is 0.7 Pa·s to 20 Pa·s.

The coating thickness is preferably set to approximately 0.1 mm to 3.0 mm. If the coating thickness is smaller than this range, then the viscous material is excessively pushed out when the steel sheet is pressed by the electrode, and the effect of limiting current passage to the welding area is not sufficiently achieved. Conversely, if the coating thickness exceeds this range, the viscous material cannot be sufficiently pushed out from the welding area when the steel sheet is pressed by the electrode, and current might not pass through the welding area. A more preferable coating thickness is 0.5 mm to 2.0 mm.

Examples of the viscous material used in our method include liquid heat curing epoxy-based organic resin, an adhesive based on this organic resin, and the like. In particular, when using a heat curing adhesive such as epoxy-based organic resin, the adhesive can be hardened by heating at the time of coating by baking the steel sheets, which is normally done after welding. Therefore, a special step for hardening such unhardened adhesive need not be provided.

The steel sheets that are welded with our method may be of any thickness, yet our method is particularly effective when the effects of warping at the time of welding are a concern due to the total thickness of the steel sheets being 2.0 mm or less.

EXAMPLES

Example 1

Our indirect spot welding method was performed on members including two overlapping rectangular steel sheets, one side of which was 500 mm or more. The steel sheets had a thickness of 0.65 mm and were cold rolled steel sheets (SPC270) having the chemical composition listed in Table 1 and a tensile strength of 270 N/mm² or more.

TABLE 1

| Chemical composition (mass %) | | | | |
|---|---|---|---|---|
| C | Si | Mn | P | S |
| 0.003 | tr | 0.09 | 0.016 | 0.004 |

Figure 4:
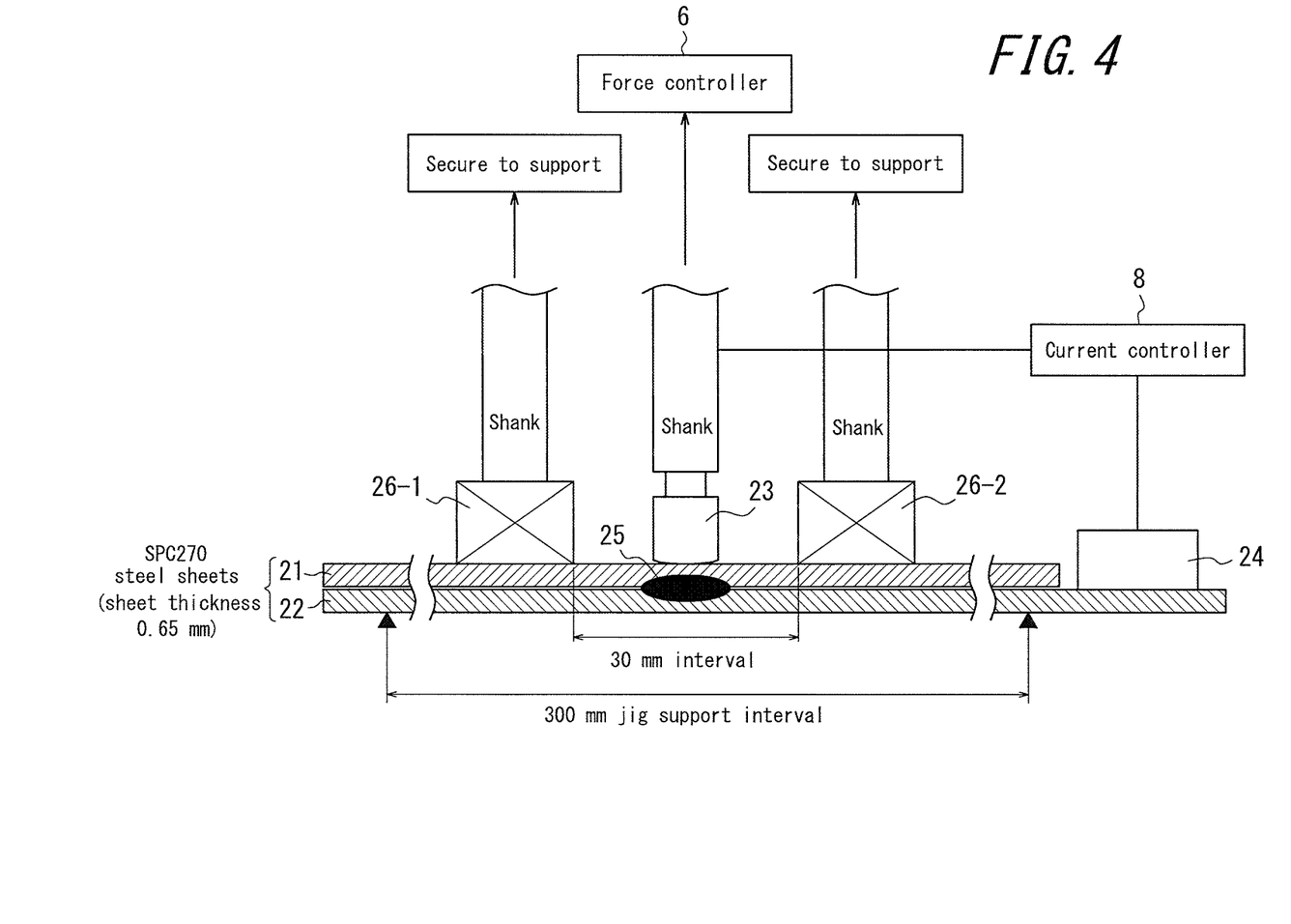
FIG. 4 illustrates how to perform indirect spot welding on an Example.

As illustrated in FIG. 4, the overlapping members were supported on a jig at 300 mm intervals, and welding was performed by securing the members formed by two overlapping steel sheets with electromagnets at two locations on either side of the weld. The electromagnets were attached via shanks to supports provided in the same system as for securing the force controller. Each electromagnet had a structure such that a flat surface on an iron core that used an iron-based material was contacted with the member. The flat surface was a square measuring 50 mm on each side. The surface magnetic flux density of the flat surface was 0.5 tesla. The interval between the electromagnets was 30 mm, and the welding electrode was applied from the upper sheet to the intermediate point between the electromagnets. A chromium-copper alloy electrode having a curved surface of R 40 mm at the tip was used as the welding electrode, a welding electrode feeding point was attached to the bottom sheet at a location remote from the weld, and welding was performed using a direct-current inverter current controller. Table 2 lists the welding time, welding current, and electrode pressing force.

TABLE 2

| Welding conditions | Welding time (s) | Welding current (kA) | Electrode pressing force (N) |
|---|---|---|---|
| a | 0.16 | 7 | 200 |
| b | 0.16 | 7 | 400 |

As illustrated in FIGS. 3(a) to 3(c), welding was also performed with insulating viscous material provided on the overlapping surface between the overlapping steel sheets. As the viscous material, liquid heat curing epoxy-based organic resin (coating thickness: 0.3 mm) was used.

Table 3 lists combinations of the above test conditions.

TABLE 3

| No. | Peripheral area of welding electrode secured by electromagnet | Welding conditions | Organic resin provided between steel sheets | Notes |
|---|---|---|---|---|
| 1 | yes | a | no | Example 1 |
| 2 | yes | b | no | Example 2 |
| 3 | yes | b | yes | Example 3 |
| 4 | no | a | no | Comparative Example 1 |
| 5 | no | b | no | Comparative Example 2 |
| 6 | no | b | yes | Comparative Example 3 |

In Table 3, welding was performed according to our method on Examples 1 to 3. In Examples 1 and 2, the weld was secured with electromagnets. In Example 3, the weld was secured with electromagnets, and welding was performed after organic resin was provided between the steel sheets. The weld was not secured with electromagnets in Comparative Examples 1 to 3.

Table 4 lists the results of examining the nugget diameter, nugget thickness, and nugget thickness/diameter of the weld when welding under the conditions listed in Table 3.

In Table 4, the nugget diameter was taken to be the length, in a cross-section cut along the center of the weld, along the overlapping surface between the upper and lower steel sheets. The nugget thickness was taken to be the maximum thickness, in a cross-section cut along the center of the weld, of the fused portion formed across the upper and lower steel sheets.

It can be determined that a weld with satisfactory strength has been obtained by forming a nugget with a good oval shape that is formed in a fused state if the nugget diameter ND satisfies Expression (1) below and if the nugget thickness/diameter is 0.22 or greater:

$$ND \geq 2.5T \quad \text{Expression (1)}$$

where ND is the nugget diameter (mm), and
T is the total thickness (mm) of the overlapping steel sheets.

TABLE 4

| No. | Nugget diameter (mm) | Nugget thickness (mm) | Nugget thickness/ diameter | Notes |
|---|---|---|---|---|
| 1 | 3.6 | 1.0 | 0.28 | Example 1 |
| 2 | 3.3 | 0.8 | 0.24 | Example 2 |
| 3 | 4.0 | 1.3 | 0.33 | Example 3 |
| 4 | 0 | 0 | — | Comparative Example 1 |
| 5 | 0 | 0 | — | Comparative Example 2 |
| 6 | 0 | 0 | — | Comparative Example 3 |

Note:
Unable to pass current in No. 6

Table 4 shows that for all of the Examples 1 to 3, in which indirect spot welding was performed according to our method, a fused nugget having a sufficient nugget diameter satisfying Expression (1) and a sufficient thickness for this diameter was obtained.

By contrast, a fused nugget was not obtained in Comparative Examples 1 to 3. In particular, in Comparative Example 3, warping of the members at the time of pressing with the electrode was too great, the organic resin provided between the steel sheets could not be pushed out, and current could not be passed between the steel sheets.

INDUSTRIAL APPLICABILITY

In an indirect spot welding method for welding members including at least two overlapping steel sheets by holding a welding electrode against a steel sheet from one side while applying pressure with the welding electrode, attaching a feeding point to a steel sheet at the other side at a location remote from the welding electrode, and allowing current to flow between the welding electrode and the feeding point, when welding a portion where overlapping steel sheets are pressed by an electrode from only one side with the other side of the steel sheets being unsupported in midair, a weld with satisfactory strength can be obtained, regardless of the rigidity of the members.

REFERENCE SIGNS LIST 1, 2 Metal sheet
3, 4 Electrode
5 Weld
6, 7 Force controller
8 Current controller
11, 12 Metal sheet
13, 14 Electrode
15-1, 15-2 Weld
21, 22 Metal sheet
23 Electrode
24 Feeding point
25 Weld
26 Rigid member

The invention claimed is:

1. An indirect spot welding method for welding members including at least two overlapping steel sheets that have a ferrite phase as a main phase by holding a welding electrode against a steel sheet from one side while applying pressure with the welding electrode, attaching a feeding point to a steel sheet at a location remote from the welding electrode, and allowing current to flow between the welding electrode and the feeding point, the method comprising:
   contacting a magnetic rigid body to the one side of the steel sheet in a peripheral area of the welding electrode;
   securing an overlapping region in the peripheral area of the welding electrode by a magnetic force produced by the rigid body; and
   welding the at least two overlapping steel sheets.

2. The indirect spot welding method of claim 1, wherein the welding is performed in a state such that an insulating viscous material is provided on an entire overlapping surface of the members except for in a welding area.

3. The indirect spot welding method of claim 1, wherein the magnetic rigid body has a circular or polygonal contact face disposed to surround the welding electrode.

4. The indirect spot welding method of claim 1, wherein during the contacting, a side of the steel sheet opposite the one side is unsupported in midair at least in the peripheral area of the welding electrode.

* * * * *